United States Patent
DeJonge et al.

(10) Patent No.: US 7,330,004 B2
(45) Date of Patent: Feb. 12, 2008

(54) METHOD AND APPARATUS FOR QUIET VARIABLE MOTOR SPEED CONTROL

(75) Inventors: Stuart DeJonge, Riegelsville, PA (US);
James P Steiner, Royersford, PA (US);
Aaron Dobbins, Macungie, PA (US);
Chen Ming Wu, Emmaus, PA (US)

(73) Assignee: Lutron Electronics Co., Inc.,
Coopersburg, PA (US)

( * ) Notice: Subject to any disclaimer, the term of this patent is extended or adjusted under 35 U.S.C. 154(b) by 0 days.

(21) Appl. No.: 11/447,728

(22) Filed: Jun. 6, 2006

(65) Prior Publication Data
US 2006/0273751 A1    Dec. 7, 2006

Related U.S. Application Data

(60) Provisional application No. 60/687,828, filed on Jun. 6, 2005.

(51) Int. Cl.
*H02K 27/00* (2006.01)
(52) U.S. Cl. .................. 318/244; 318/245; 318/727
(58) Field of Classification Search ............... 318/244, 318/245
See application file for complete search history.

(56) References Cited

U.S. PATENT DOCUMENTS

| | | | |
|---|---|---|---|
| 1,783,175 | A | 12/1930 | Jordan |
| 2,057,214 | A | 10/1936 | Sleeter et al. |
| 2,867,761 | A | 1/1959 | Hartmann, Jr. |
| 3,466,529 | A | 9/1969 | Grafham |
| 3,737,752 | A | 6/1973 | Strachan |
| 3,764,822 | A | 10/1973 | Ebbinge et al. |

(Continued)

FOREIGN PATENT DOCUMENTS

DE    38 20 267 A1    12/1989

(Continued)

OTHER PUBLICATIONS

Freescale Semiconductor, Inc., Single Phase AC Induction Motor Control Reference Design for M68HC08 Microcontrollers, Mar. 2003, pp. 1-44.

(Continued)

*Primary Examiner*—Lincoln Donovan
*Assistant Examiner*—Michael Brandt
(74) *Attorney, Agent, or Firm*—Ostrolenk, Faber, Gerb & Soffen, LLP

(57) ABSTRACT

An apparatus for controlling the speed of an AC motor comprising a switch adapted to be coupled in parallel with power terminals for the AC motor; a capacitor coupled in series with the parallel combination of the switch and the motor; the capacitor adapted to provide an AC supply voltage from an AC source to the parallel circuit comprising the motor and the switch; and a control circuit for controlling the conduction time of the switch in order to vary the speed of the motor. The switch is preferably pulse-width modulated at a frequency twice the line frequency of the AC supply voltage, and the switch is turned on when the voltage across the AC motor is zero volts. The apparatus is operable to provide for continuously variable control of the motor speed while minimizing acoustic noise in the motor.

34 Claims, 18 Drawing Sheets

U.S. PATENT DOCUMENTS

| | | |
|---|---|---|
| 3,787,724 A | 1/1974 | Pedersen et al. |
| 3,935,522 A | 1/1976 | Tsay |
| 3,956,688 A | 5/1976 | Schwartz |
| 4,075,865 A | 2/1978 | Wills |
| 4,093,899 A | 6/1978 | Denny |
| 4,320,328 A | 3/1982 | Rudolph, Jr. |
| 4,350,944 A | 9/1982 | Strauch, Jr. |
| 4,352,993 A | 10/1982 | Hannas |
| 4,371,823 A | 2/1983 | Lohest |
| 4,409,528 A | 10/1983 | Podell |
| 4,422,030 A | 12/1983 | McAllise |
| 4,436,486 A | 3/1984 | Jensen et al. |
| 4,527,101 A | 7/1985 | Zavis et al. |
| 4,527,496 A | 7/1985 | Kemmel |
| 4,560,909 A | 12/1985 | Peil |
| 4,584,507 A | 4/1986 | Taylor |
| 4,618,805 A | 10/1986 | Hornung |
| 4,659,290 A | 4/1987 | Kundert |
| 4,716,409 A | 12/1987 | Hart et al. |
| 4,734,012 A | 3/1988 | Dob et al. |
| 4,743,816 A | 5/1988 | Prather |
| 4,990,002 A | 2/1991 | French |
| 4,992,709 A | 2/1991 | Griffin et al. |
| 5,191,971 A | 3/1993 | Hakkarainen et al. |
| 5,365,154 A | 11/1994 | Schneider et al. |
| 5,466,995 A | 11/1995 | Genga |
| 5,466,999 A | 11/1995 | Hutsell |
| 5,511,943 A | 4/1996 | Chang |
| 5,734,248 A | 3/1998 | Kemp et al. |
| 6,256,211 B1 | 7/2001 | Milazzotto et al. |
| 6,329,783 B1 | 12/2001 | Vrionis et al. |
| 6,329,785 B1 | 12/2001 | Starkie et al. |
| 6,457,681 B1 | 10/2002 | Wolf et al. |
| 6,486,625 B1 | 11/2002 | Vilou |
| 6,590,356 B2 * | 7/2003 | Smith et al. ............... 318/254 |
| 6,684,944 B1 * | 2/2004 | Byrnes et al. ............. 165/247 |
| 6,809,497 B2 | 10/2004 | Kudo et al. |
| 6,909,258 B2 | 6/2005 | Milazzotto et al. |
| 2002/0085398 A1 | 7/2002 | Bixel |
| 2003/0030408 A1 | 2/2003 | Ratz et al. |
| 2003/0117820 A1 | 6/2003 | Milazzotto et al. |
| 2004/0090807 A1 | 5/2004 | Youm |
| 2004/0101312 A1 | 5/2004 | Cabrera |
| 2004/0160792 A1 | 8/2004 | Youm et al. |
| 2004/0164773 A1 | 8/2004 | Ho |

FOREIGN PATENT DOCUMENTS

| | | |
|---|---|---|
| EP | 1 286 122 | 2/2003 |
| JP | 2001 016895 A | 1/2001 |
| JP | 2001 145358 A | 5/2001 |

OTHER PUBLICATIONS

Product specification sheet AN1007 of Teccor Electronics, "Thyristors Used as AC Static Switches and Relays," 2002 Teccor Electronics, Thyristor Product Catalog.

Lightolier Controls, Press Release: "Lightolier Controls Redefines Whole House Lighting Control with Pair of Industry Firsts," Apr. 14, 2003, 2 pages.

Telcom Semiconductor, Inc., Application Note 58: Suppressing Acoustic Noise in PWM Fan Speed Control Systems, Jul. 31, 2000, 5 pages.

Jenkins Electric Company, Controls Catalog, not dated, front cover, pp. 18-19.

Rockwell Automation, SMC Controllers Application and Product Guide, Apr. 2002, 52 pages.

* cited by examiner

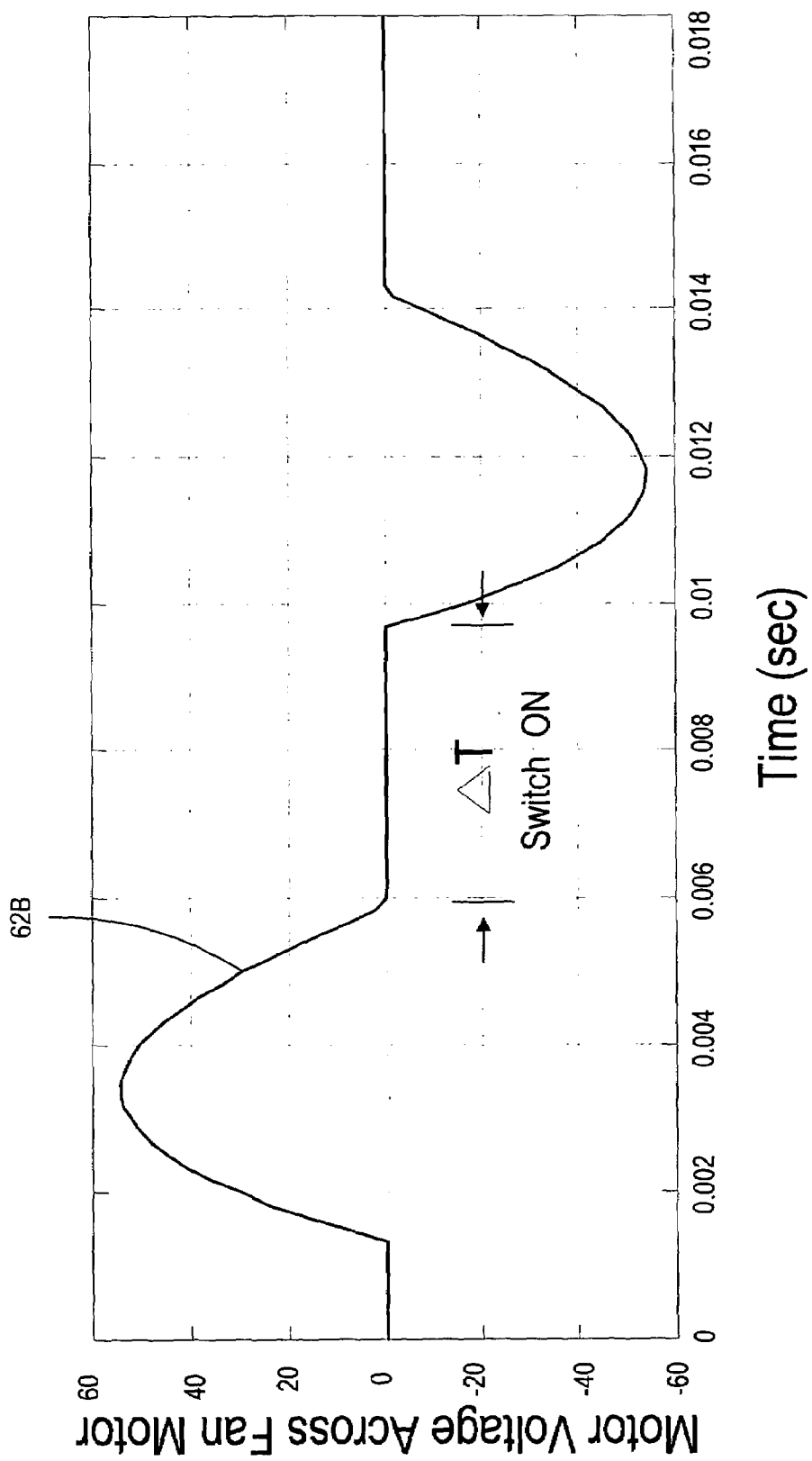

Sound Measurements with Control 10 of Fig. 1A

| RPM | Noise (dBA) |
|---|---|
| 144 | 45.8 |
| 112 | 37.7 |
| 88 | 31.8 |
| 73 | 28.9 |

Sound Measurements with Control 20 of Fig. 1D

| RPM | Noise (dBA) |
|---|---|
| 146 | 45.8 |
| 120 | 38.8 |
| 104 | 33.5 |
| 80 | 25.6 |
| 42 | 19.3 |
| 27 | 18.5 |

Sound Measurements with Control 50 of Fig. 2

| RPM | Noise (dBA) |
|---|---|
| 116 | 37.5 |
| 102 | 33.3 |
| 90 | 29.0 |
| 74 | 24.3 |
| 57 | 20.6 |
| 38 | 19.3 |
| 22 | 18.4 |
| 10 | 18.4 |

Fig. 6C

METHOD AND APPARATUS FOR QUIET VARIABLE MOTOR SPEED CONTROL

RELATED APPLICATIONS

This application claims priority from commonly-assigned U.S. Provisional Application Ser. No. 60/687,828, filed Jun. 6, 2005, having the same title as the present application, the entire disclosure of which is hereby incorporated by reference.

BACKGROUND OF THE INVENTION

1. Field of the Invention

The present invention relates to load control devices for providing variable power to alternating-current (AC) loads, for example, motor loads, and more particularly, to AC fan motors. More particularly, the invention relates to a quiet variable fan speed control, which allows substantially full variability in the fan speed control.

2. Description of the Related Art

A problem with known controllers for fan motors is that some of the techniques that have been used in the past have serious disadvantages. For example, fully variable fan speed controls are known. FIG. 1A shows a prior art fully variable fan speed control 10 in which a switch 12, typically comprising a bidirectional semiconductor switch, such as a triac, is controlled by a control circuit 14 to change the phase angle at which the triac begins conducting, thereby providing variable speed control. The fan speed control 10 is coupled between an AC power source 16 and a fan motor 18. As well known to those skilled in the art, by controlling the phase angle at which the triac begins conducting (i.e., the conduction time of the triac each half-cycle of the AC power source), the amount of power delivered to the fan motor and thus the speed of the fan motor, can be controlled.

Although the prior art fan speed control 10 provides a substantially fully variable speed control, a problem with this circuit is that when a fan motor is controlled by the phase angle technique, mechanical and acoustic noises may be generated in the fan motor, which can be annoying and distracting. FIG. 1B shows the waveforms of the AC input line voltage 30A, the motor voltage 30B applied to the fan motor by the switch, and the motor current 30C through the fan motor. As can be observed from the waveforms, the motor voltage 30B has large discontinuities, and thus harmonics, which cause noise and vibration to be generated in the fan motor. FIG. 1C shows further waveforms showing the line voltage 32A and motor currents 32B, 32C through the fan motor for near low speed and near high speed operation in graphs {a} and {b}, and the line voltage 32A and motor voltages 32D, 32E across the fan motor in graphs {c} and {d} for near low speed and near high speed operation. The harmonics in the motor voltages 32D, 32E delivered to the fan motor cause significant amounts of distracting noise and vibration, and accordingly, a better solution is desirable.

FIG. 1D shows another prior art approach that provides a quiet fan speed control 20. In this approach, a plurality of semiconductor switches 21, 22, 23, for example triacs, are provided. A capacitor 24 is provided in series with switch 22 and a capacitor 25 is provided in series with switch 23. Different values of capacitance in series with the fan motor induce different fan speeds. By controlling the switches 22, 23 to selectively insert and remove the capacitors 24, 25 from the circuit, a plurality of discrete fan speeds are provided. If switch 21 of FIG. 1D is conductive, the fan motor 18 operates at full speed. If either switches 22 or 23, or combinations of these switches, are conductive, depending upon the series capacitances, the fan motor will operate at some slower speed. Accordingly, with the circuit shown in FIG. 1D, as many as four different discrete speeds can be obtained.

However, this does not allow continuous or fully or near fully variable speed control. Additional capacitors and switches can be provided to obtain more discrete speed levels, but the circuitry becomes unnecessarily complex, large, and expensive as more components are added. An example of this type of speed control is described in U.S. Pat. No. 4,992,709, issued Feb. 12, 1991, entitled SWITCHING CIRCUIT PROVIDING ADJUSTABLE CAPACITIVE SERIES VOLTAGE DROPPING CIRCUIT WITH A FRACTIONAL HORSEPOWER MOTOR, the entire disclosure of which is incorporated herein by reference.

Nevertheless, the system shown in FIG. 1D does provide a quiet fan speed control. FIG. 1E shows waveforms of the line voltage 34A, motor voltage 34B, and motor current 34C for the prior art fan speed control 20 of FIG. 1D. As can be observed, the waveforms are fairly continuous and smooth, lacking the discontinuities of the system shown in FIG. 1A. Since the switches 21, 22, 23, are either on or off, and not operated according to the phase cut technique of the fan speed control 10 of FIG. 1A, the waveforms do not exhibit discontinuities. FIG. 1F shows further waveforms of the line voltage 36A and motor currents 36B, 36C through the fan motor in graphs {a} and {b}, and line voltage 36A and motor voltages 36D, 36E across the fan motor in graphs {c} and {d} for near low and near high speed operation.

Although this prior art system provides for a quiet fan speed control, it suffers from the drawback that the speeds are not able to be controlled continuously or fully variably or even near fully variably.

Accordingly, a more satisfactory solution, which provides the advantages of quiet fan speed control as well near fully variable speed control, and even continuously variable fan speed control, is desirable.

SUMMARY OF THE INVENTION

The present invention provides an apparatus for controlling the speed of an AC motor to be driven from an AC supply voltage from an AC source, comprising a series capacitor adapted to be coupled in series between the AC source and the AC motor, a shunt switch adapted to be coupled in parallel electrical connection across the AC motor, and a control circuit for controlling the conduction time of the switch. The shunt switch has a control input that is coupled to the control circuit for control of the shunt switch. The motor speed is controllable in dependence on the conduction time of the shunt switch.

According to a preferred embodiment of the present invention, the control circuit is operable to generate a pulse-width modulated signal for controlling the conduction time of the shunt switch. The pulse-width modulated signal has a variable duty cycle for varying the motor speed. According to another embodiment, the apparatus comprises a bypass switch coupled in parallel electrical connection across the series capacitor to bypass the series capacitor to achieve substantially full speed operation of the AC motor.

The invention further provides a method for controlling the speed of an AC motor driven from an AC supply voltage from an AC source, comprising the steps of coupling a first capacitor in series electrical connection between the AC source and the AC motor; coupling a first switch in shunt electrical connection across the AC motor, the switch having a control input for controlling the conduction time of the first switch; and controlling the conduction time of the switch to vary the speed of the motor. The motor speed is controllable in dependence on the conduction time of the shunt switch.

According to a preferred embodiment, the step of controlling comprises generating a pulse-width modulated signal for controlling the conduction time of the first switch. The pulse-width modulated signal has a variable duty cycle for varying the motor speed. According to another embodiment, the method further comprises the steps of coupling a second switch in parallel electrical connection with the first capacitor; and closing the second switch to by pass the first capacitor to achieve substantially full speed operation of the motor.

Other features and advantages of the present invention will become apparent from the following description of the invention, which refers to the accompanying drawings.

BRIEF DESCRIPTION OF THE DRAWINGS

The invention will now be describe in greater detail in the following detailed description with reference to the drawings in which:

FIG. 5B is a further diagram to assist and explain the operation of the circuit of FIG. 2 when the switch is on;
FIG. 6A shows a motor voltage waveform of the circuit of FIG. 2;
FIG. 6C shows the numeric values of the noise level measurements of the graph of FIG. 6B.

DETAILED DESCRIPTION OF PREFERRED EMBODIMENTS OF THE INVENTION

Figure 1A:
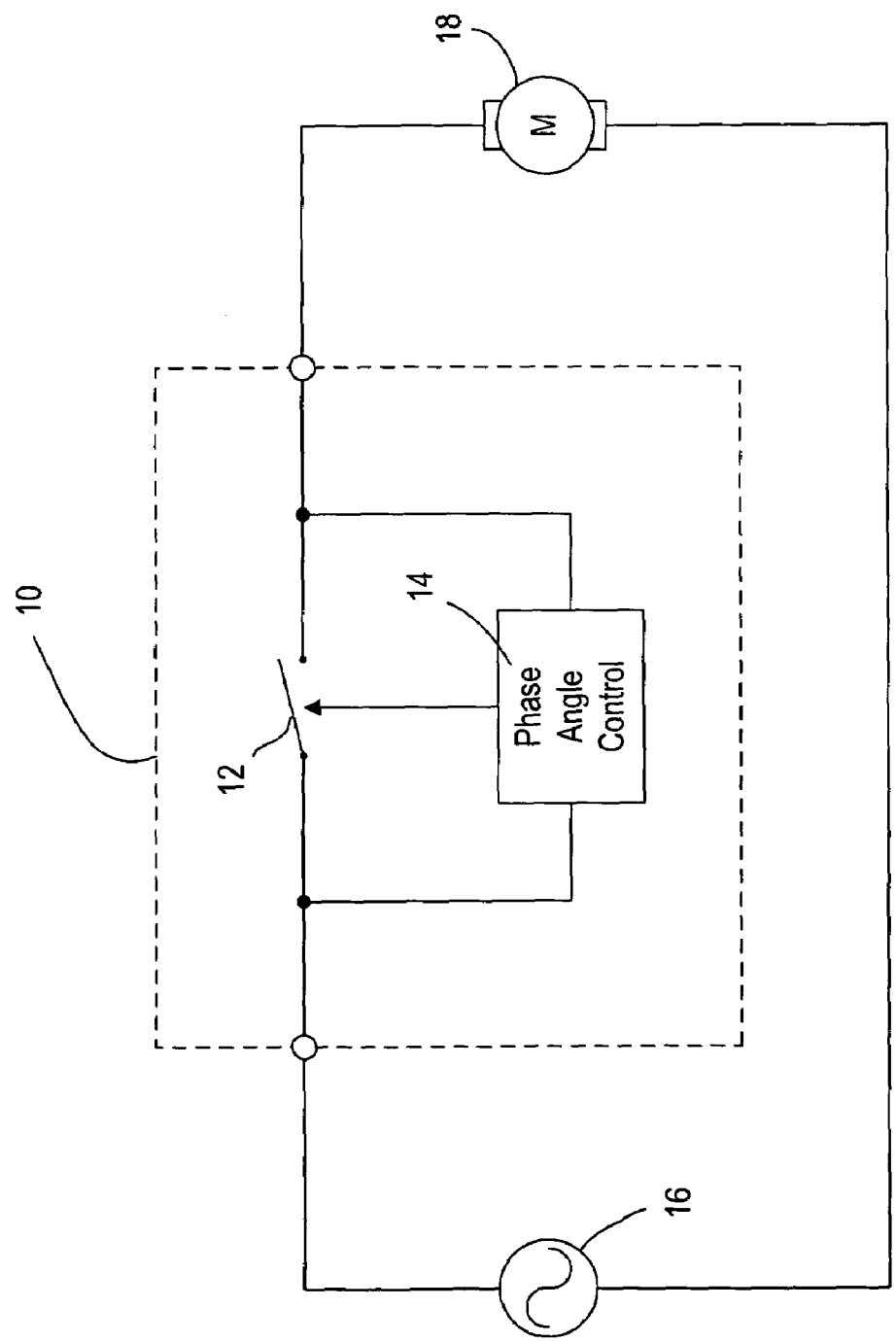
FIG. 1A shows a prior art variable fan speed control.
Figure 1B:
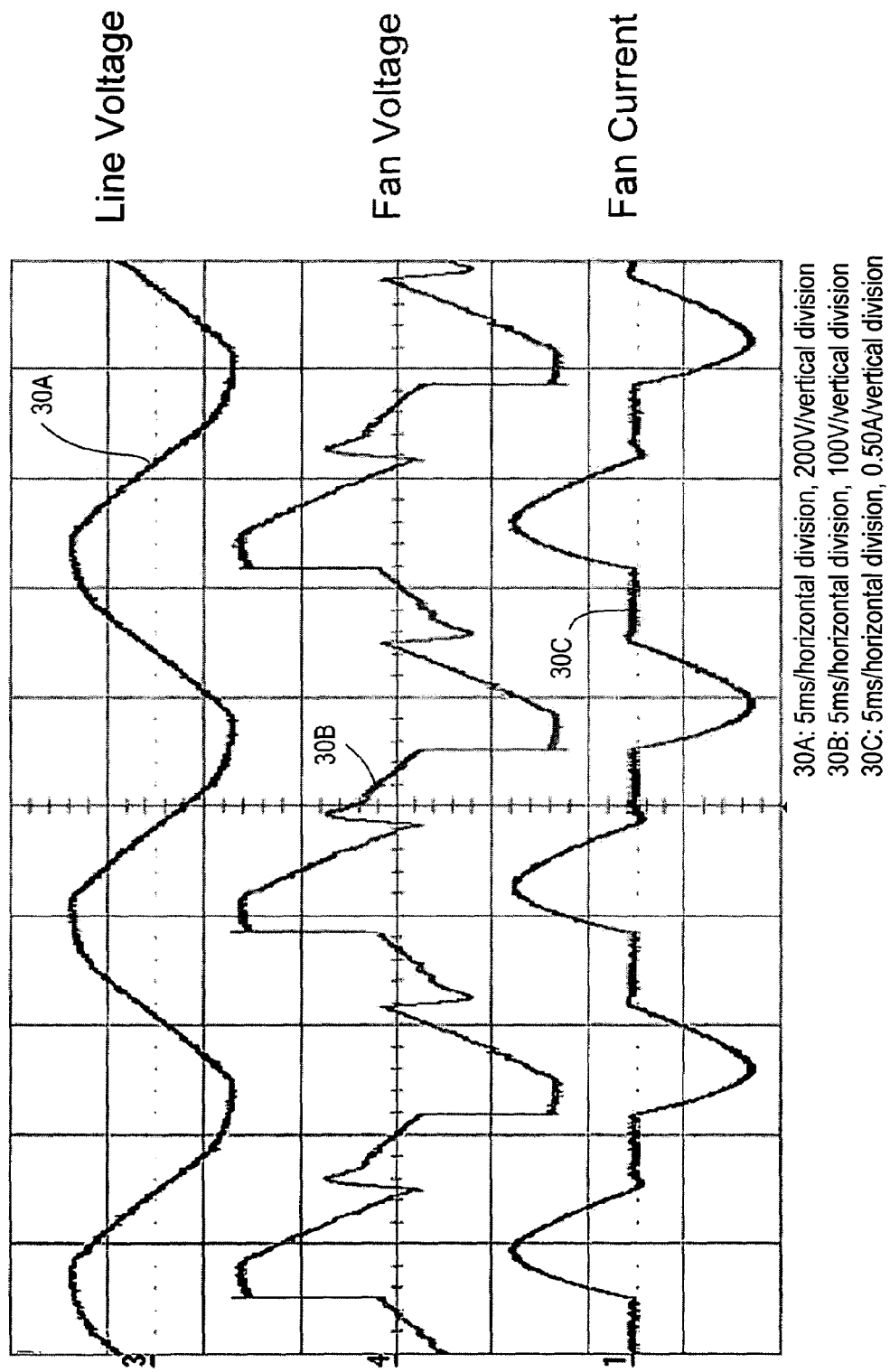
FIG. 1B shows waveforms for the circuit of FIG. 1A.
Figure 1C:
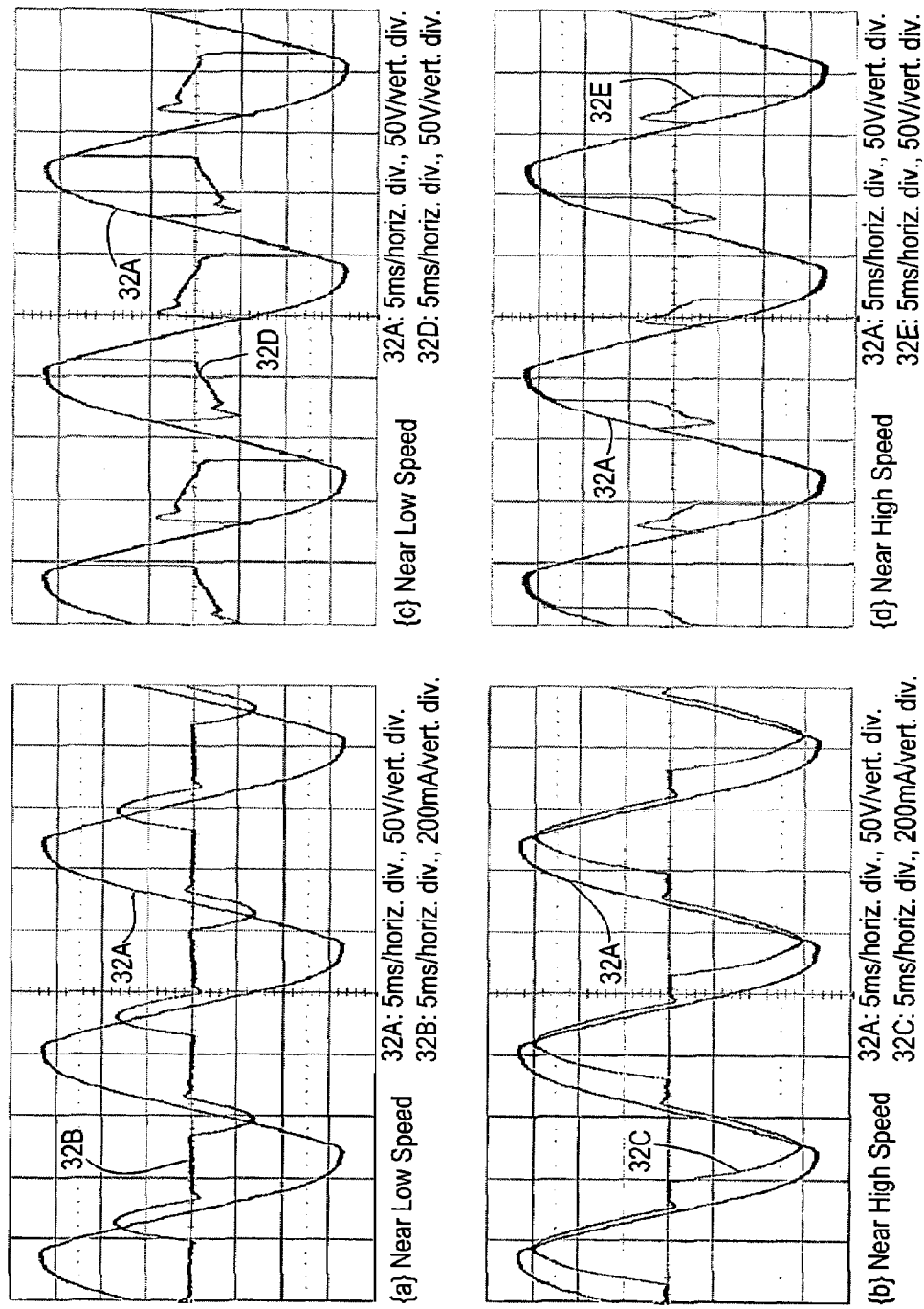
FIG. 1C shows further waveforms for the circuit of FIG. 1A.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2:
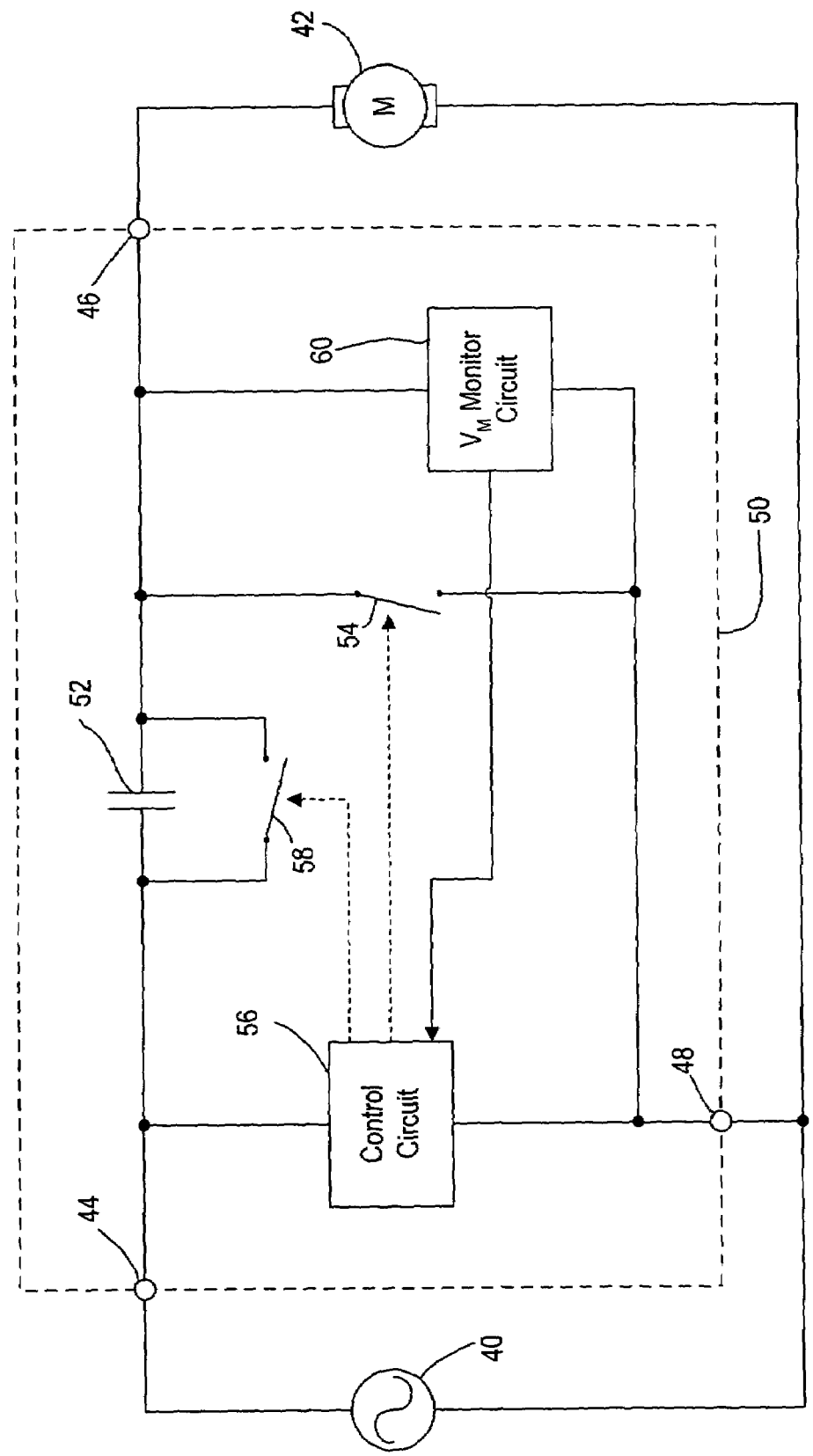
FIG. 2 shows a simplified circuit diagram of a circuit according to the present invention for providing a continuously variable quiet fan speed control.

Turning again to the drawings, FIG. 2 shows a simplified block diagram of a continuously variable quiet fan speed control 50 according to the present invention. The fan speed control 50 has a hot terminal 44, which is coupled to an AC power source 40, and a load terminal 46, which is connected to a fan motor 42. The fan motor 42 may be a brushless or brushed motor, although typically, it will be a brushless synchronous or induction motor. The fan speed control 50 further includes a neutral terminal 48, which is connected to both the AC power source 40 and the fan motor 42. The AC power source 40 provides power through a series capacitor 52 to the fan motor 42. The series capacitor 52 preferably has a capacitance of 18 μF.

Arranged across the fan motor 42 is a shunt switch 54 which may be a suitable semiconductor device, for example, two anti-series connected field effect transistors (FETs) functioning as a bidirectional switch, or a single FET in a rectifier bridge, also functioning as a bidirectional switch. A control circuit 56 controls the conduction time of the switch 54 by providing a pulsed signal to the gate of the switch 54. In particular, switch 54 is driven by a pulse-width modulated (PWM) signal to control the conduction time. When the switch 54 is conductive, the fan motor 42 is essentially shorted, such that there is substantially no voltage across the fan motor. When the switch is non-conductive, a portion of the supply voltage is provided to the fan motor 42 through the capacitor 52. The effect is to vary the power provided to the fan motor 42 depending on the conduction time of the switch 54. When switch 54 is on continuously, no power is delivered to the fan motor 42 and the speed will decrease or the fan motor will remain at a standstill. As the conduction time of the switch 54 is decreased, the fan speed is increased. When the switch 54 is non-conductive at all times, i.e., during the entire AC line cycle, the fan motor reaches its maximum speed as permitted through series-connected capacitor 52.

In order to achieve full speed operation, a bypass switch 58 is optionally provided in parallel with capacitor 52 to shunt the capacitor and thus apply the full AC supply voltage to the fan motor 42. The optional bypass switch 58 is also controlled by the control circuit 56.

Further, as will be explained below, because the switching occurs when the motor voltage is zero and the discontinuities in the motor current are reduced, the invention provides a quiet fan speed control. The invention does not suffer from the disadvantages of the prior art circuit of FIG. 1, which produces significant amounts of acoustic noise and is not limited to the discrete speed settings of the prior art circuit of FIG. 1D.

In order to reduce the acoustic noise, it has been determined that it is preferable to close the switch 54 when the motor voltage $V_M$ across the fan motor is substantially zero. The voltage $V_M$ across the fan motor is monitored by a $V_M$ monitor circuit 60. The $V_M$ monitor circuit 60 is preferably implemented as a zero-cross detect circuit that identifies the zero-crossings of the motor voltage $V_M$. A zero-crossing is defined as the time when the motor voltage transitions through zero, i.e., when the motor voltage changes from a positive value to zero or a negative value to zero, for example, zero-crossing 61A in FIG. 4. The $V_M$ monitor circuit 60 provides a signal representative of the zero-crossings of the motor voltage $V_M$ to the control circuit 56. The idle state of the output signal of the $V_M$ monitor circuit 60 is a logic high level. When a zero-crossing occurs, the $V_M$ monitor circuit 60 will briefly pulse the output signal to a logic low level.

When the motor voltage $V_M$ is zero (i.e., a zero-crossing has been detected), the shunt switch 54 is closed. This is believed to have the effect of reducing the Lorentz forces that act to cause the fan motor to vibrate and cause acoustic noise. Furthermore, closing the shunt switch 54 provides a path for the motor current to circulate, thereby reducing any discontinuities in the motor current and helping to minimize the magnetic forces that contribute to noisy operation and vibration.

It has also been determined that a suitable frequency for the pulse-width modulation signal is twice the line frequency of the AC source voltage. Accordingly, for a 60 hertz AC main frequency, the frequency of the pulse-width modulated signal is preferably 120 Hz.

Figure 3A:
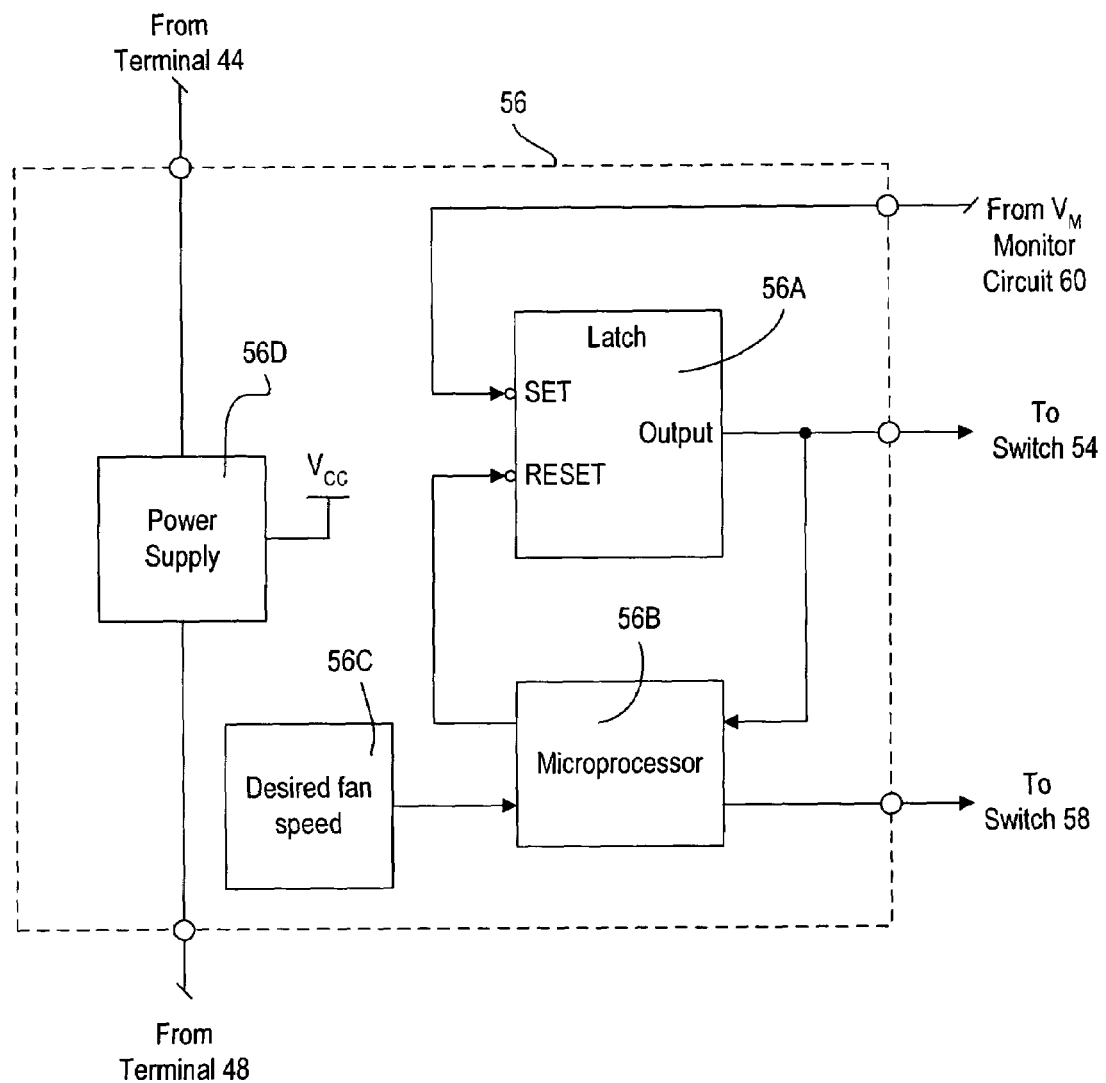
FIG. 3A is a simplified block diagram of a control circuit of the circuit of FIG. 2.

FIG. 3A is a simplified block diagram of the control circuit 56 of the circuit of FIG. 2. The control circuit includes a latch 56A having two active low inputs (i.e., a SET input and a RESET input) and an output. The output of the latch 56A provides the control signal for the shunt switch 54. The SET input of the latch 56A is received from the $V_M$ monitor circuit 60 and controls the turn-on of the shunt switch 54. A microprocessor 56B receives the output of the latch 56A and provides a control signal to the RESET input of the latch 56A in order to control the turn-off of the shunt switch 54. The microprocessor 56B also includes an output for control of the bypass switch 58. The microprocessor 56B may be any suitable processing device, such as a programmable logic device (PLD), a microcontroller, or an application specific integrated circuit (ASIC).

Further, the microprocessor 56B receives a desired fan speed input 56C, which the microprocessor uses to determine the length of the on-time of the shunt switch 54. The desired fan speed input 56C may be received from user interface of the fan speed control 50 comprising one or more actuators for allowing the user to adjust the fan speed. The desired fan speed input 56C may also be received from a communication circuit that allows the fan speed control 50 to receive signal representative of a desired fan speed from other devices in a control system. The communication circuit could be coupled to a communication link, such as, a wired serial communication link, a power-line carrier (PLC) communication link, or a wireless communication link, such as an infrared (IR) or a radio frequency (RF) communication link. An example of such a control system is described in greater detail in commonly-assigned co-pending U.S. Patent Application, Ser. No. 11/447,431, filed on the same day as the present application, entitled SYSTEM FOR CONTROL OF LIGHTS AND MOTORS, the entire disclosure of which is hereby incorporated by reference.

The control circuit 56 further comprises a power supply 56D for generating a DC voltage to power the latch 56A, microprocessor 56B, and other low-voltage circuitry of the fan speed control 50. The power supply 56D is coupled between the hot terminal 44 and the neutral terminal 48 of the fan speed control 50.

To produce the PWM signal for controlling the shunt switch 54, the latch 56A receives inputs from the $V_M$ monitor circuit 60 and the microprocessor 56B. Preferably, the control circuit 56 drives the shunt switch 54 into conduction at the zero-crossings of the motor voltage $V_M$. Specifically, when the latch 56A receives a low pulse (i.e., approximately zero volts) on the signal from the $V_M$ monitor circuit 60 at the SET input, the latch will pull the output up to the logic high level (i.e., $V_{CC}$), thus, driving the shunt switch 54 into conduction. Depending on the desired fan speed input 56C, the microprocessor will hold the output to the RESET input of the latch 56A high (i.e., at $V_{CC}$) for a period of time before driving the RESET input low (i.e., approximately zero volts). Thus, the latch 56A will drive the output to the shunt switch 54 low causing the shunt switch to stop conducting.

Figure 3B:
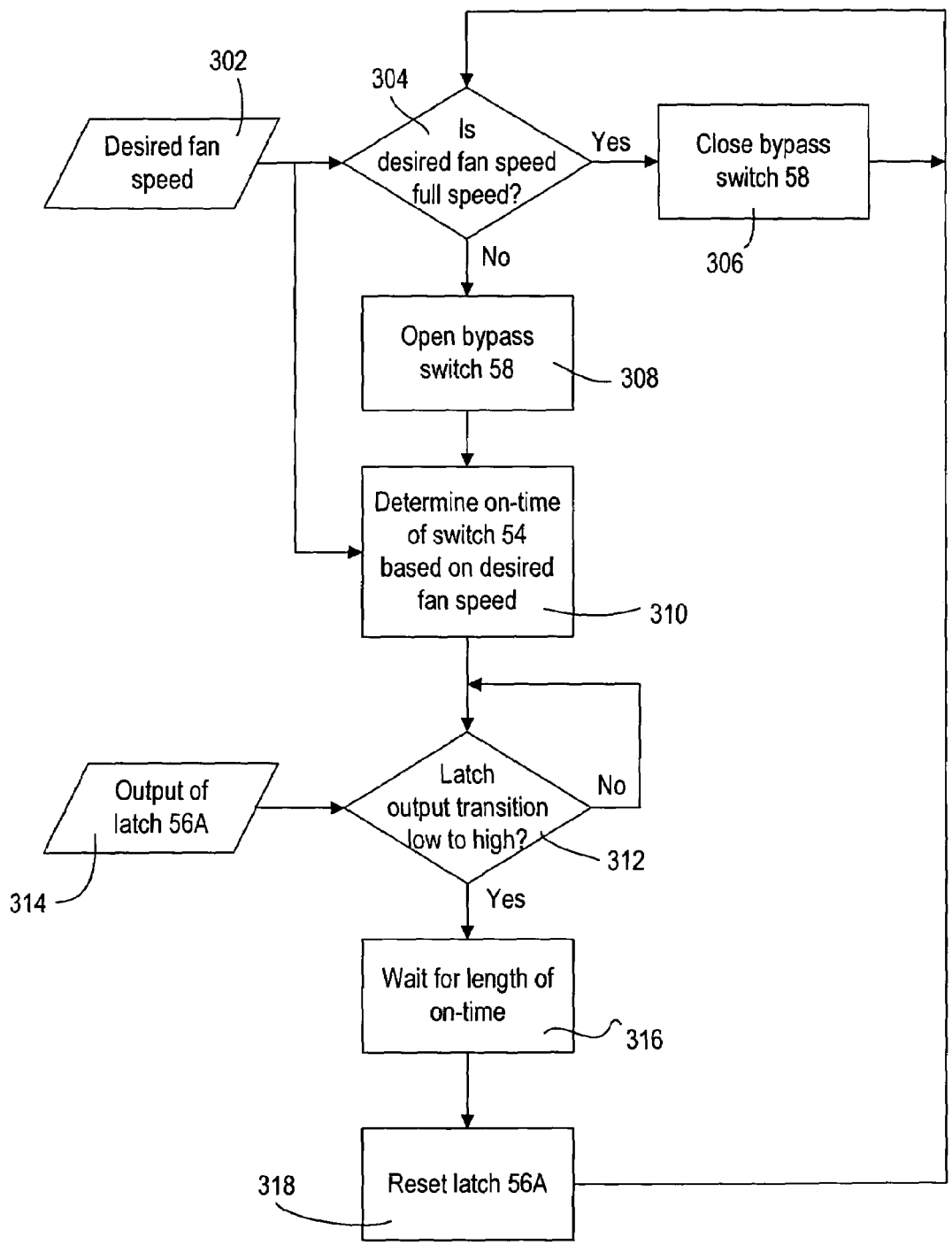
FIG. 3B is a flowchart of the control loop of a microprocessor of the control circuit of FIG. 3A.

FIG. 3B is a flowchart of the control loop 300 of the microprocessor 56A for controlling the fan speed. The desired fan speed input 56C is provided to the control loop 300 at input 302. At step 304, if the desired fan speed input 302 is the full speed, the bypass switch 58 is closed at step 306 and the process loops until the desired fan speed changes. If the desired fan speed input 302 is not the full speed at step 304, the bypass switch 58 is opened at step 308. Next, a desired on-time, $t_{ON}$, for the shunt switch 54 is determined based on the desired fan speed input 302. The determination of the on-time $t_{ON}$ in step 310 may simply be computed by a linear function, for example, $t_{ON} = (1 - DFS)/f_{PWM}$, where DFS is the desired fan speed as a percentage between 0% and 100% and $f_{PWM}$ is the frequency of the PWM signal (i.e., 120 Hz).

At step 312, the microprocessor 56A waits until the output of the latch 56A transitions from a logic low level to a logic high level. When the output of the latch 56A at input 314 is high, the shunt switch 54 is closed. At step 316, the microprocessor 56B waits for the length of the on-time $t_{ON}$ determined at step 310. Then, the latch 56A is reset by driving the RESET input of the latch 56A low at step 318. Accordingly, the output of the latch 56A will transition to a logic low level, thus, causing the shunt switch 54 to open. Finally, the process loops around to see if the desired fan speed has changed at step 302.

While the control circuit 56 includes the latch 56A as a separate hardware device (as shown in FIG. 3A), the functionality of the latch 56A could alternatively be implemented completely by the software of the microprocessor 56B. For example, the microprocessor 56B could receive the signal from the $V_M$ monitor circuit 60 and directly control the switch 54 in response to the signal from the $V_M$ monitor circuit 60.

Figure 4:
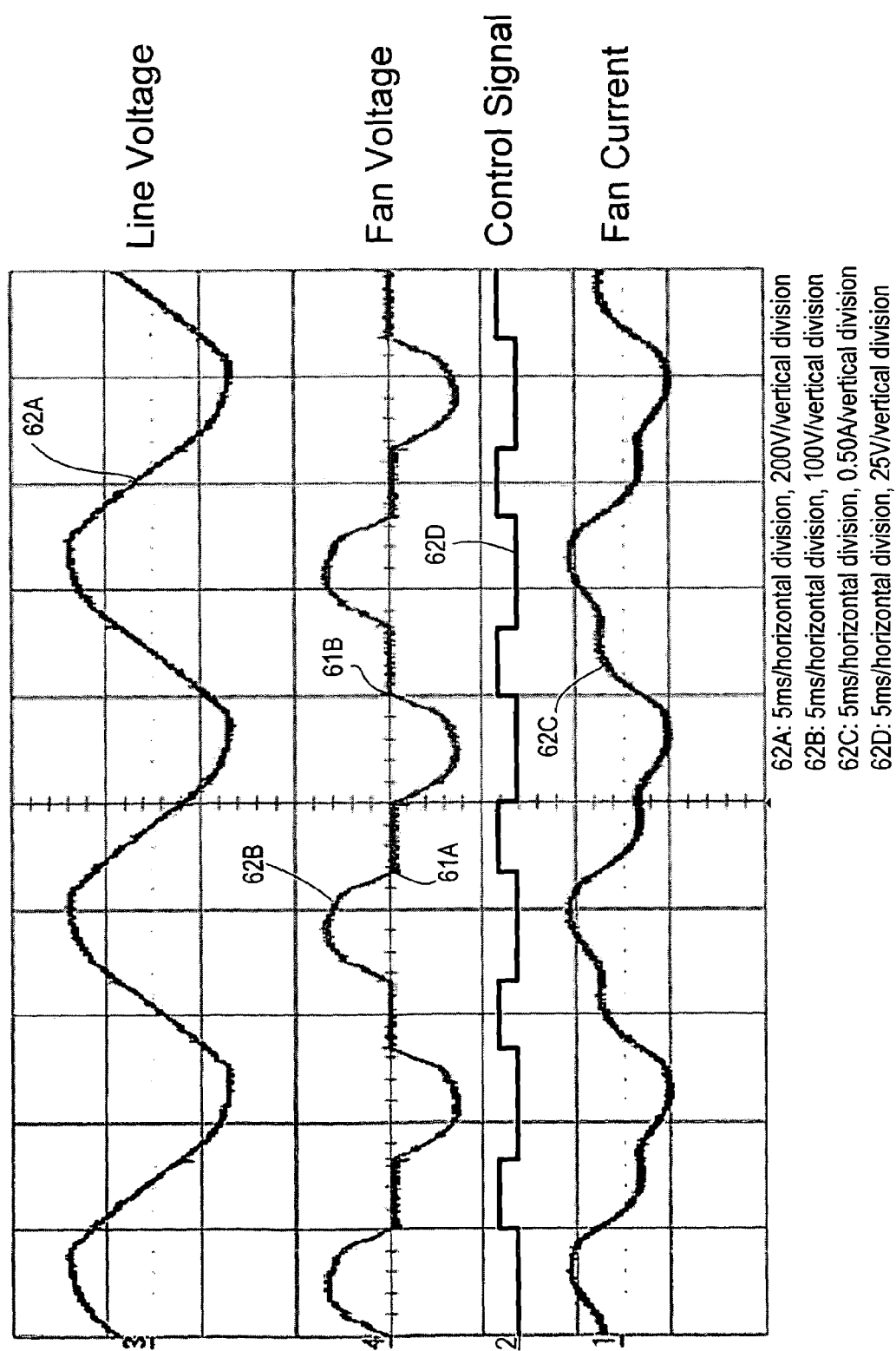
FIG. 4 shows waveforms in the circuit of FIG. 2.

FIG. 4 is a diagram of waveforms of the circuit of FIG. 2, showing the line voltage 62A, the motor voltage 62B, the motor current 62C, and the shunt switch control signal 62D. Although the motor voltage 62B and the motor current 62C are non-sinusoidal, the switch 54 switches when the motor voltage is zero and the motor current is substantially continuous. As shown in FIG. 4, the switch 54 is operated at twice the frequency of the line voltage 62A.

FIG. 6A shows further details of the motor voltage 62B in the circuit of FIG. 2. The time $\Delta T$ during which the switch 54 is conducting is shown. When the switch 54 is non-conducting, voltage is applied to the fan motor 42. The ratio of the time period $\Delta T$ to the period of the motor voltage represents the duty cycle of the PWM signal. In FIG. 6A, the duty cycle is somewhat less than 50%. The duty cycle is varied between 0% and 100% in order to control the fan speed. At 0%, the fan motor is at full speed as determined by the series capacitance 52. At 100%, the fan motor is at a standstill.

Figure 5A:
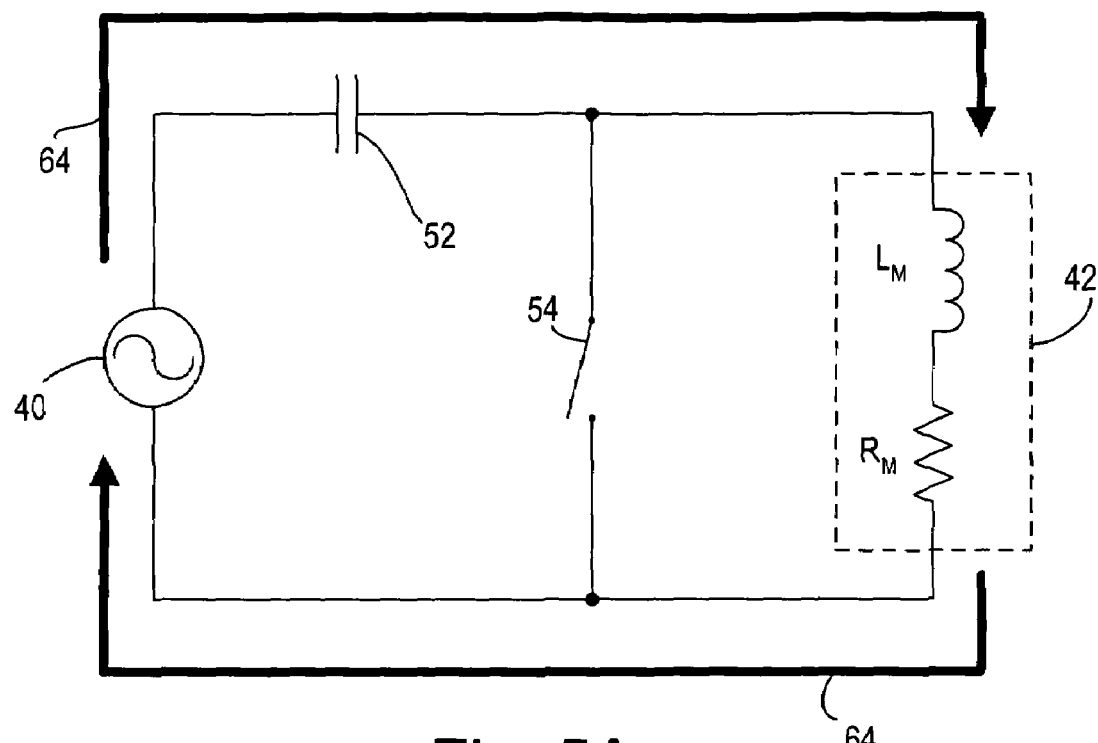
FIG. 5A is a circuit diagram explaining the operation of the circuit of FIG. 2 when the switch is off.

FIG. 5A shows an equivalent circuit diagram when the switch 54 is off showing that a current 64 flows from the AC voltage source 40 through the capacitor 52 and through the inductive fan motor 42. The fan motor 42 is shown modeled as an inductor $L_M$ in series with a resistor $R_M$.

Figure 5B:
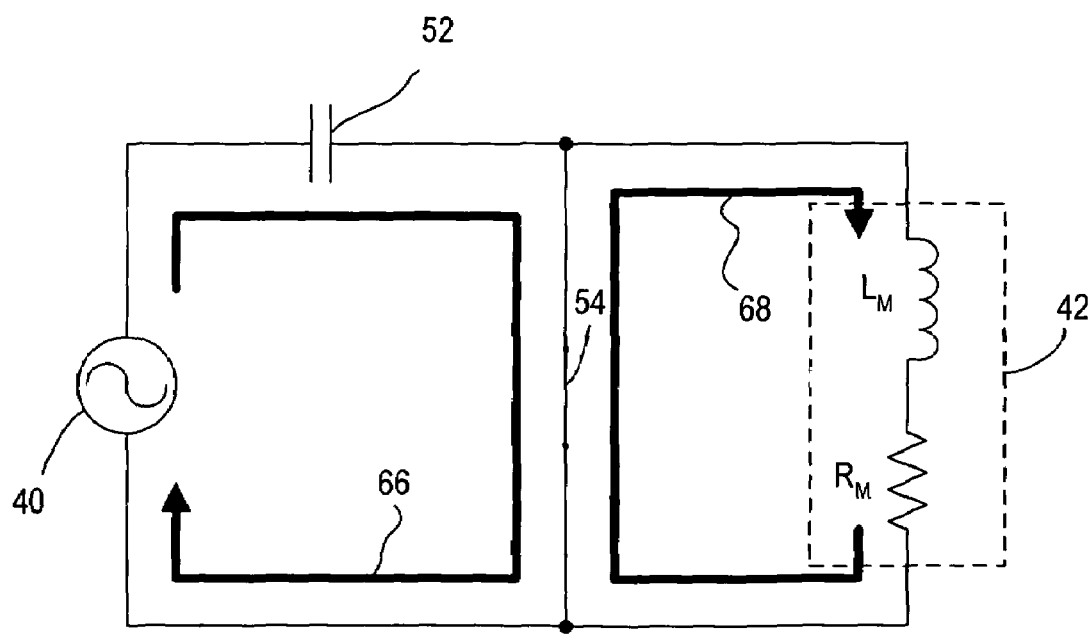

FIG. 5B shows the equivalent circuit when the switch 54 is turned on. A current 66 through the capacitor circulates in the loop comprising the capacitor 52, the switch 54, and the AC voltage source 40. An inductive current 68 continues to circulate through the fan motor 42 flows and the closed switch 54 as shown in FIG. 5B. As shown in FIG. 4, when the switch 54 is on, the inductive current 68 in the fan motor 42 begins to decrease and then reverses polarity and begins to increase at a decreasing rate until the switch is again turned off. As shown in FIG. 4, the switch 54 is turned on when the motor voltage across the fan motor is zero volts, i.e., at the voltage negative-going zero-crossing 61A and the positive-going zero-crossing 61B.

The value of the switch on-time, ΔT, as shown in FIG. 6A, controls the fan speed. The greater the on-time ΔT, the lower the speed. As shown in FIG. 5B, when the switch is closed, the current 68 circulates through the fan motor.

Figure 6B:
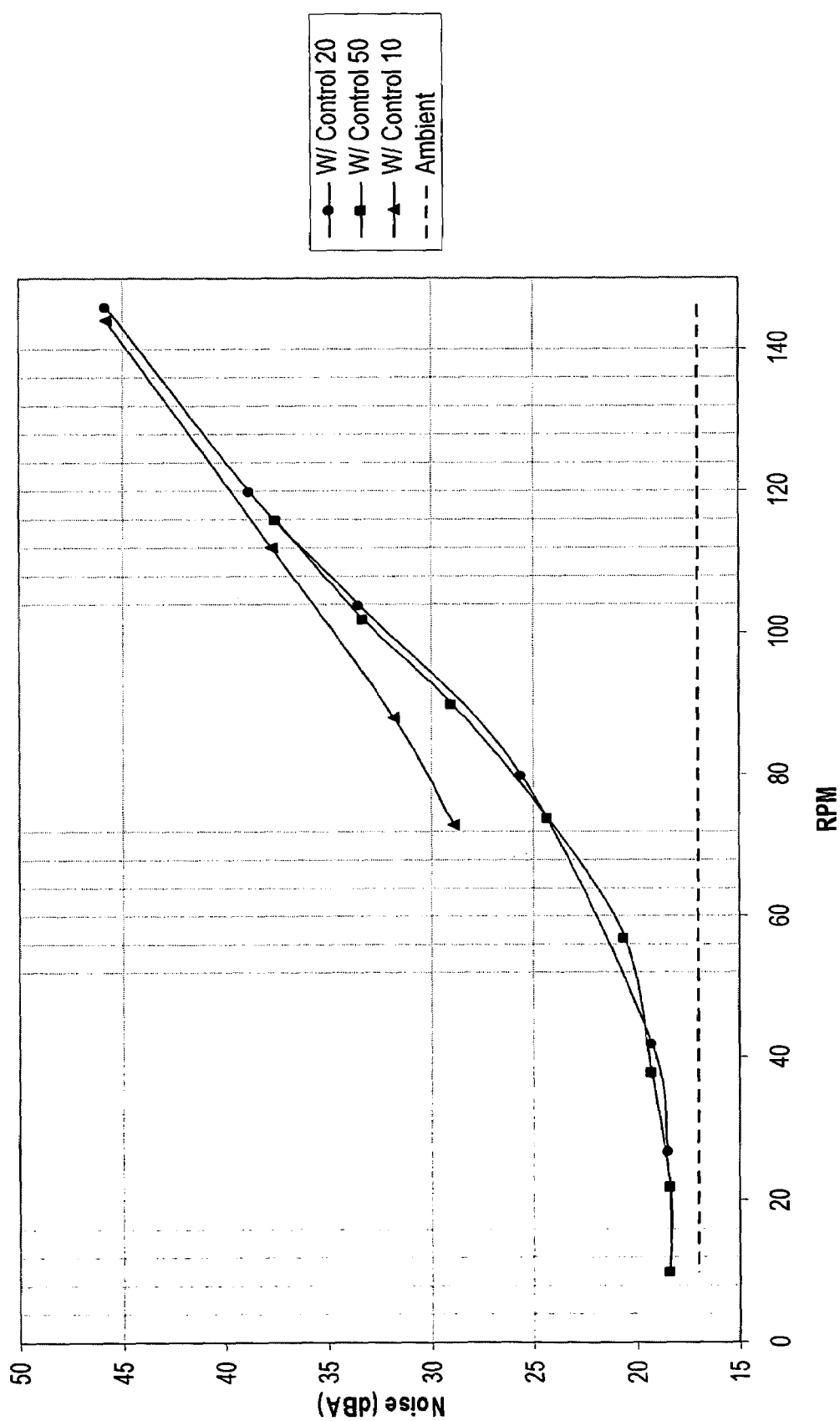
FIG. 6B shows a graph of sound measurements taken of a fan motor operated by the fan speed control of the present invention of FIG. 2, the prior art fan speed control of FIG. 1A, and the prior art fan speed control of FIG. 1D.

Thus, the fan speed control 50 provides continuously variable, quiet control of the fan motor 42. FIG. 6B shows a graph of sound measurements taken in close proximity of a fan motor using the fan speed control 50 of the present invention of FIG. 2, the prior art fan speed control 10 of FIG. 1A, and the prior art fan speed control 20 of FIG. 1D. The fan motor was operated at different RPM (revolutions per minute) levels for each fan speed control and the sound measurements were recorded. All tests were performed using the same fan motor with an ambient noise level of 17 dBA. The numeric values of the sound measurements of FIG. 6B are shown in FIG. 6C.

As shown by the graph of FIG. 6B, the fan speed control 50 offers a quiet operation that is very similar to the noise level produced by the prior art quiet fan speed control 20. In contrast, the fan speed control 50 provides continuously variable fan speed control, while the prior art fan speed control 20 does not provide continuously variable operation of the fan motor. Further, the continuously variable fan speed control 50 provides improved operation in regards to the noise level produced in comparison to the prior art continuously variable fan speed control 10.

Figure 7:
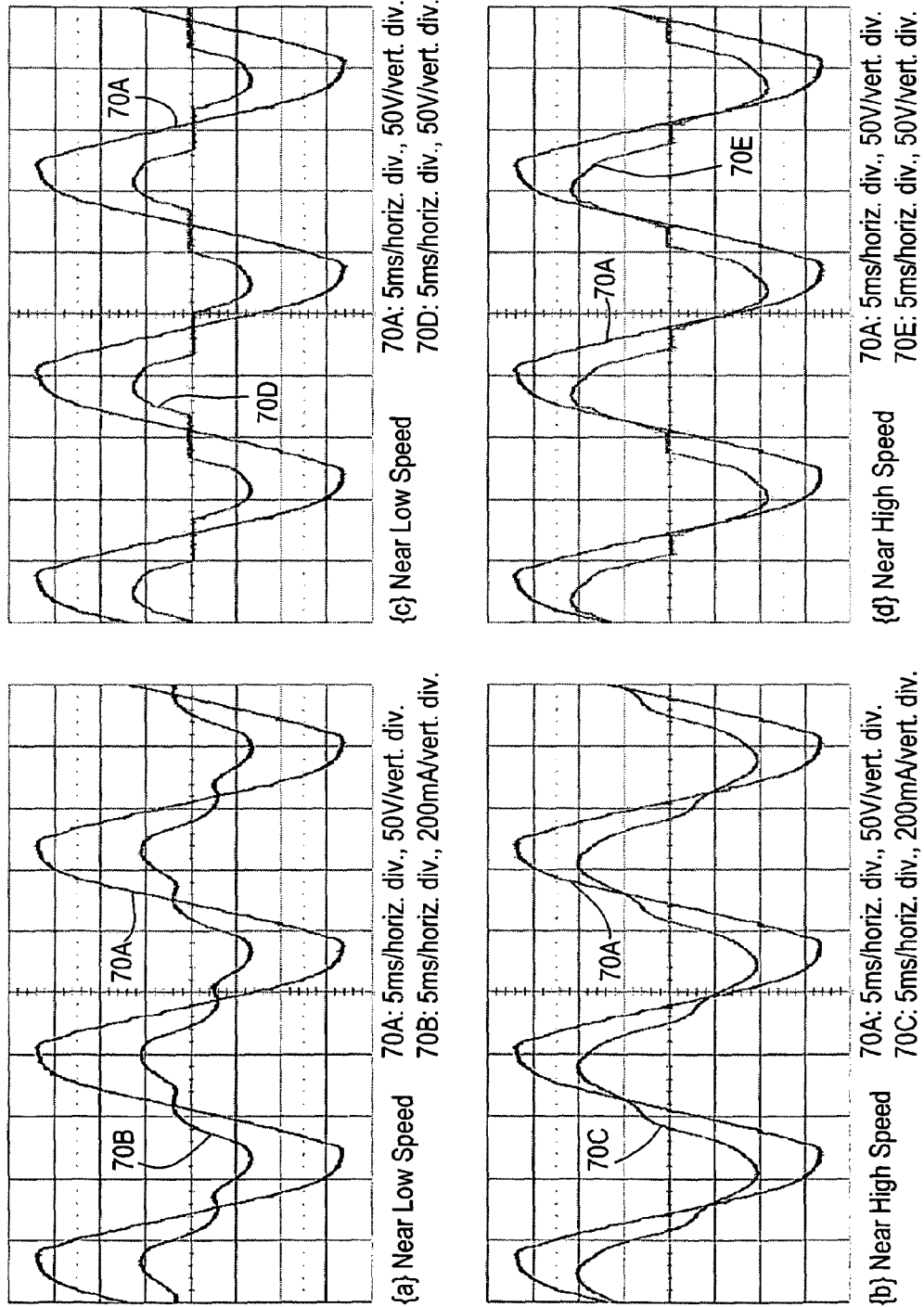
FIG. 7 shows further waveforms of the circuit of FIG. 2.

FIG. 7 shows additional waveforms of the circuit of FIG. 2. In particular, the line voltage 70A and the motor current 70B through the fan motor for near low speed operation are shown in graph {a}. The line voltage 70A and the motor current 70C through the fan motor at near high speed are shown in graph {b}. The line voltage 70A and the motor voltage 70D across the fan motor for near low speed operation are shown in graph {c} and the line voltage 70A and the motor voltage 70E across the fan motor for near high-speed operation in graph {d}.

Referring to FIG. 2, the shunt switch 54, the bypass switch 58, and the capacitor 52, as well as the control circuit 56, may be contained within a wall-mounted control located in a junction box. Since the neutral line is present, a power supply for the control circuit 56 operating the shunt switch 54 and the bypass switch 58 may be provided with power developed from the potential across the hot and neutral lines.

Often, a fan motor has trouble starting up when the fan motor is turned on at a very low speed. To overcome this problem when starting up the fan motor 42 and the desired starting fan speed is low, the control circuit 56 initially "kick starts" the fan motor 42 by driving the fan motor 42 at the maximum speed by opening the shunt switch 52 for a predetermined period of time. After this period of time, the fan motor 42 is operating at an acceptable speed and the control circuit 56 then operates the shunt switch 52 with the PWM signal and drives the fan motor at the desired lower speed. Alternatively, the control circuit 56 could close the bypass switch 58 to provide the full AC supply voltage to the fan motor for the predetermined period of time, open the bypass switch 58, and drive the fan motor to the desired lower speed.

Figure 8:
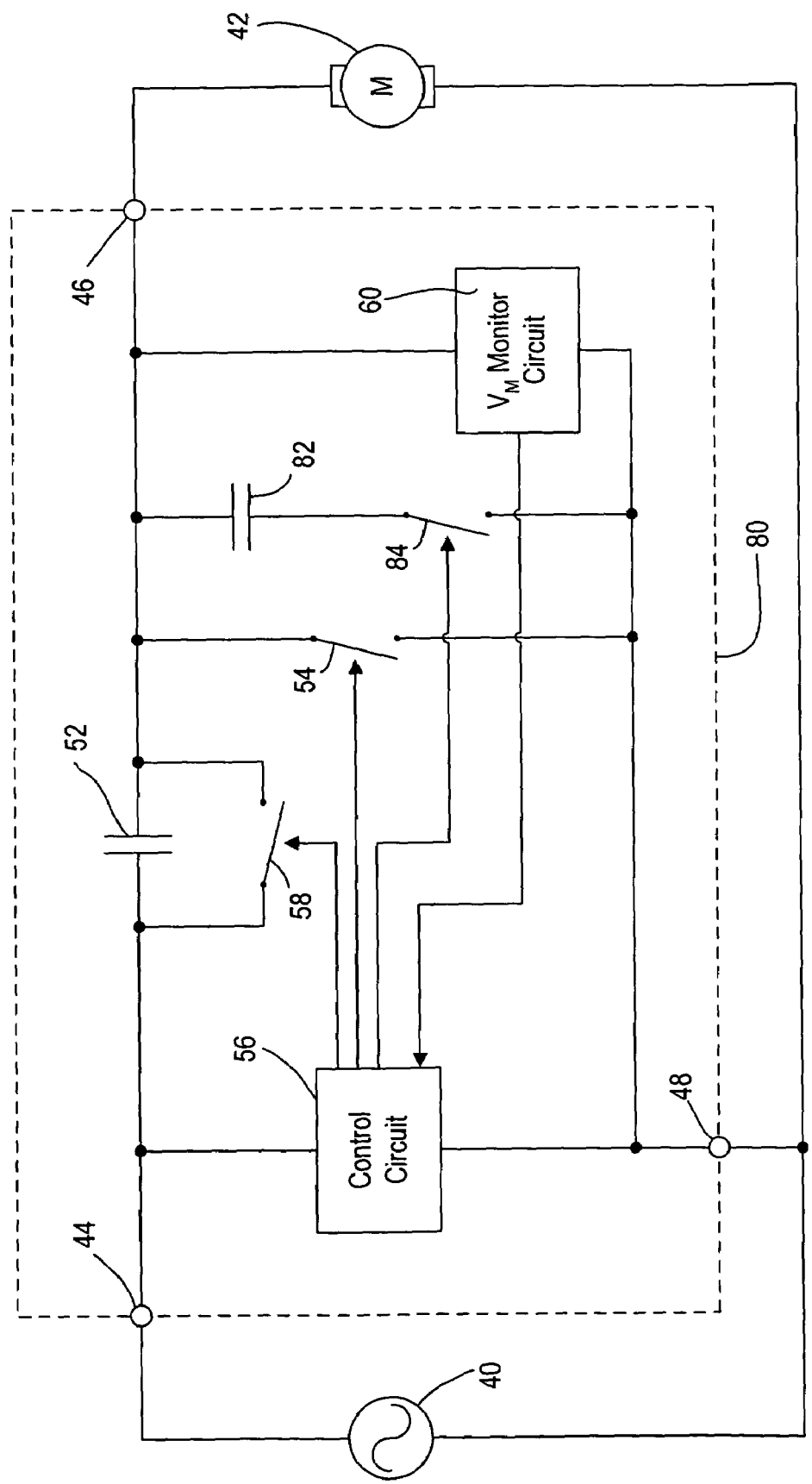
FIG. 8 shows a simplified circuit diagram of a second embodiment of a circuit according to the present invention.

FIG. 8 shows a simplified circuit diagram of a fan speed control 80 according to a second embodiment of the present invention. The fan speed control 80 includes a capacitor 82 in parallel with the shunt switch 54. A bypass switch 84 is connected in series with the capacitor 82 and is controlled by a control circuit 86 to selectively remove the capacitor 82 from the circuit of the fan speed control 80. The capacitor 82 preferably has a capacitance of 4.7 μF.

When the switch 84 is open, the fan speed control 80 operates in the same manner as the fan speed control 50 of FIG. 2. However, when the switch 84 is closed, the capacitor 82 is connected in parallel with the fan motor 42 and provides a path for high frequency currents to flow to neutral. The capacitor 82 acts as a filter by eliminating high frequency components in the motor voltage across the fan motor 42, which further reduces audible noise created by the fan motor.

If the full speed of the fan motor 42 is desired, the switch 58 is closed to bypass the capacitor 52, and the switch 84 is opened to remove the capacitor 82 from the circuit of the fan speed control 80. Since some current will flow through the capacitor 82 when the switch 84 is closed, the fan motor 42 cannot run at the maximum possible speed. Thus, the switch 84 is opened when the maximum fan speed is desired.

Figure 9:
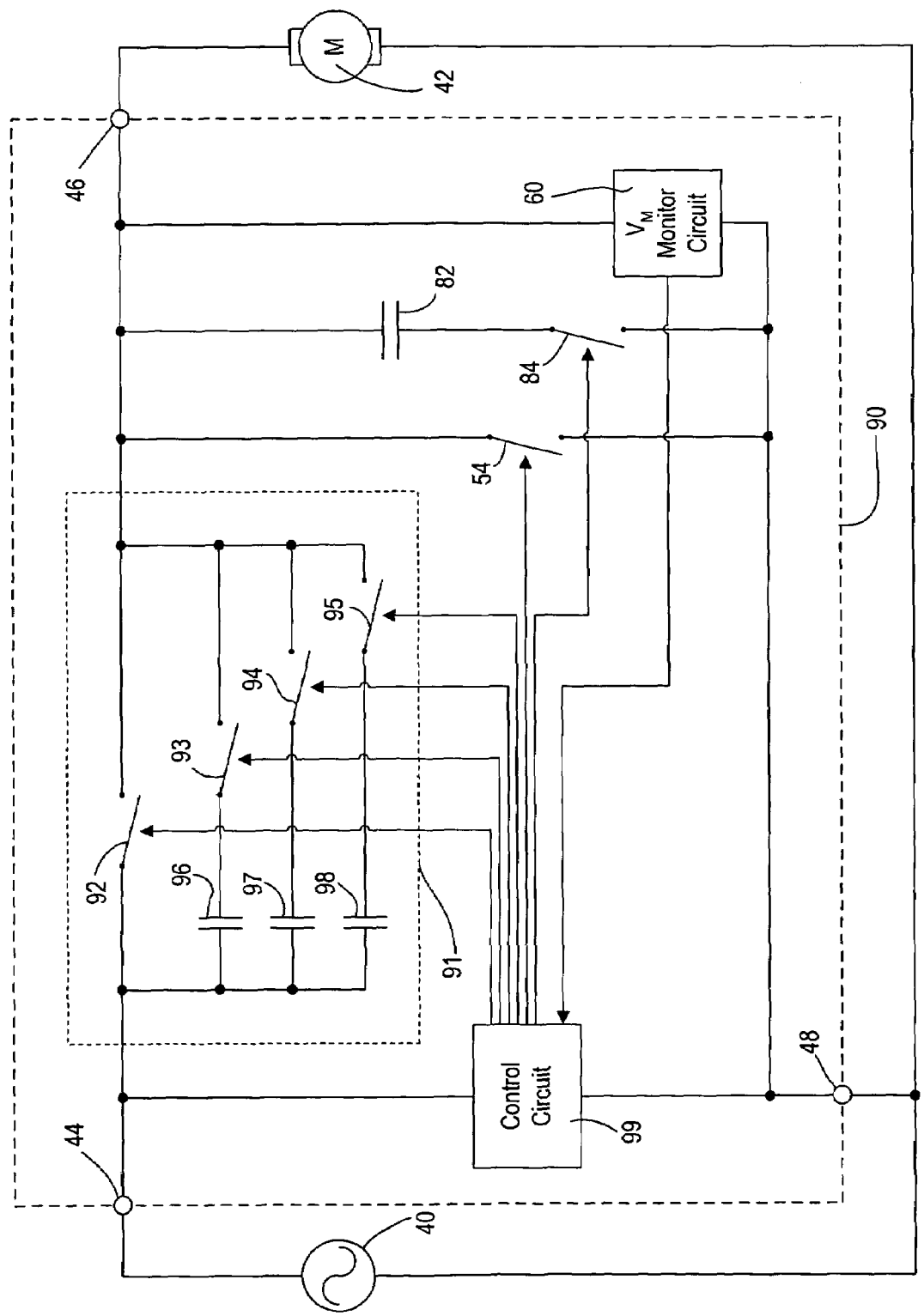
FIG. 9 shows a simplified circuit diagram of a third embodiment of a circuit according to the present invention.

FIG. 9 shows a simplified circuit diagram of a fan speed control 90 according to a third embodiment of the present invention. The fan speed control 90 includes a switched capacitor network 91 in series with the terminals 44, 46. The switch capacitor network 91 comprises a plurality of switches 92, 93, 94, 95, each separately controlled by a control circuit 99. Three of the switches 93, 94, 95 are each connected in series with one of three capacitors 96, 97, 98, respectively.

The fan speed control 90 offers three different modes of operation to drive the fan motor 42. The first mode of operation (referred to herein as "120 Hz AC buck" mode) functions in a similar manner as the fan speed control 80 of FIG. 8. In this mode, one of the switches of the switched capacitor network 91 (for example, the switch 93) is constantly closed such that one of the series capacitor (for example, the capacitor 96) is in series with the terminals 44, 46. While the control circuit 99 maintains the switch 84 closed, the control circuit (99 provides a pulse-width modulated signal, preferably at a frequency of approximately 120 Hz, to control the shunt switch 54 and the speed of the fan motor 42. To provide the full AC voltage to the fan motor 42, the control circuit 99 causes the switch 92 to close and the switch 84 to open.

Figure 1D:
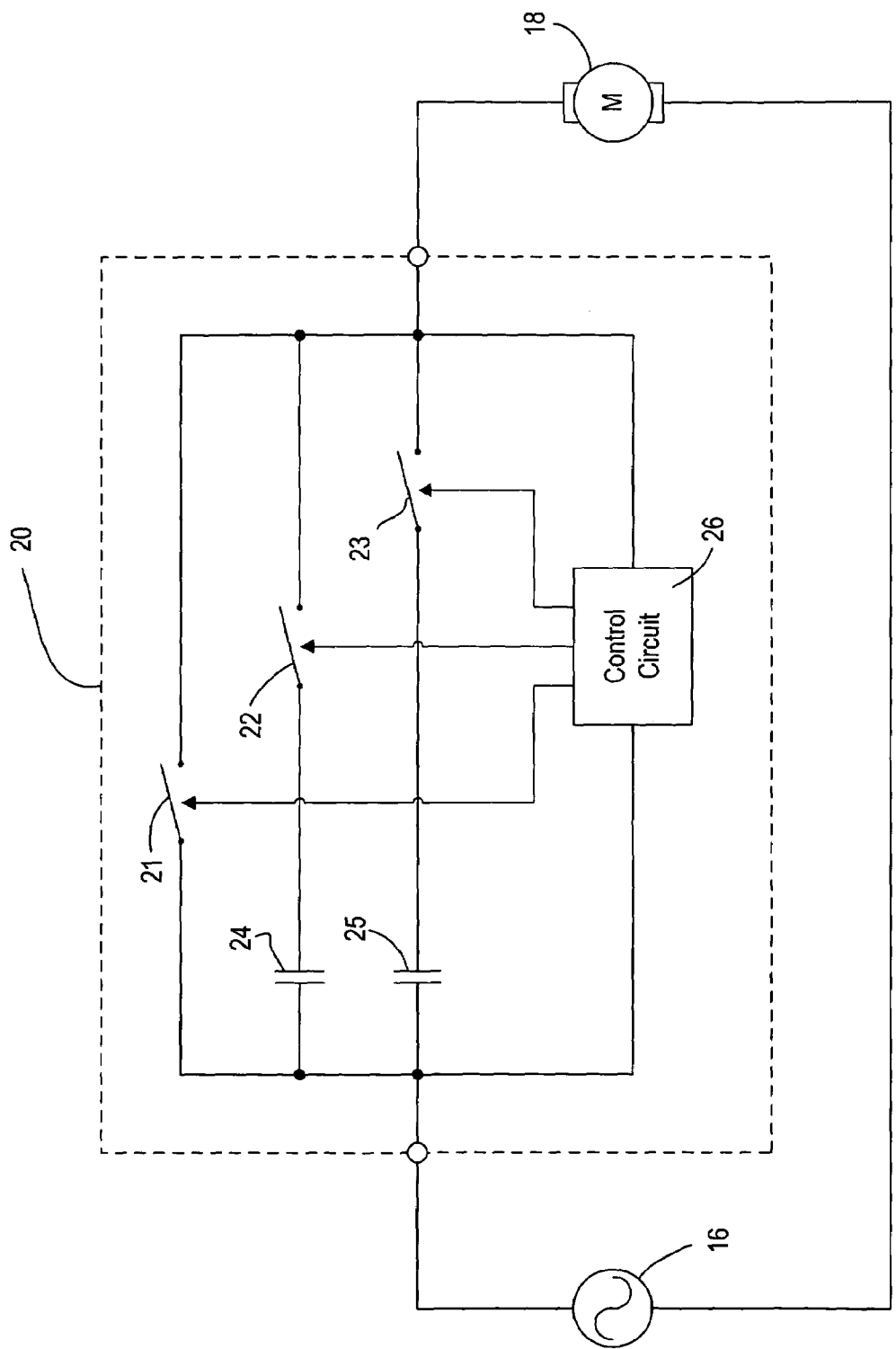
FIG. 1D shows another prior art fan speed control.
Figure 1E:
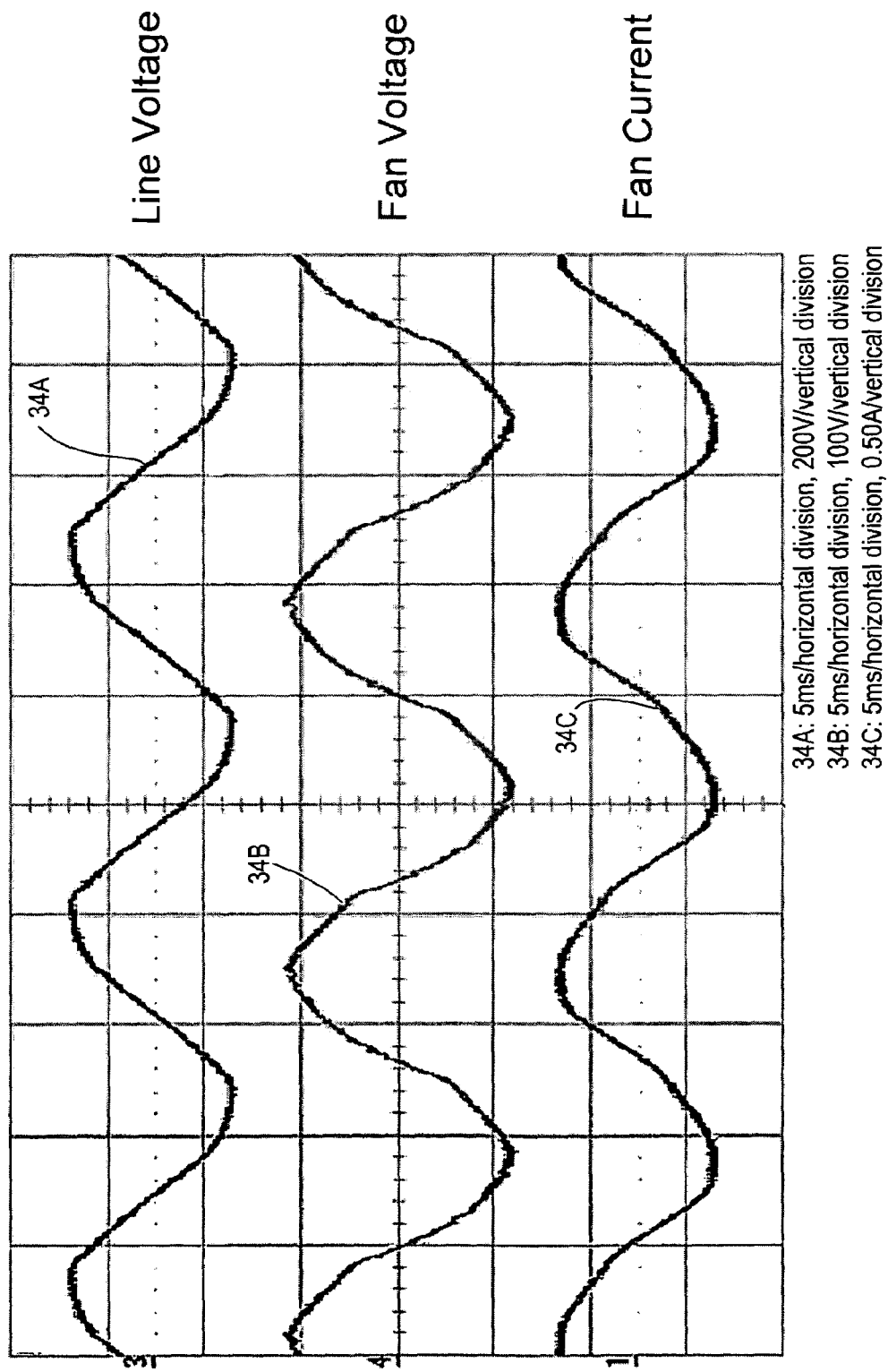
FIG. 1E shows waveforms for the circuit of FIG. 1D.
Figure 1F:
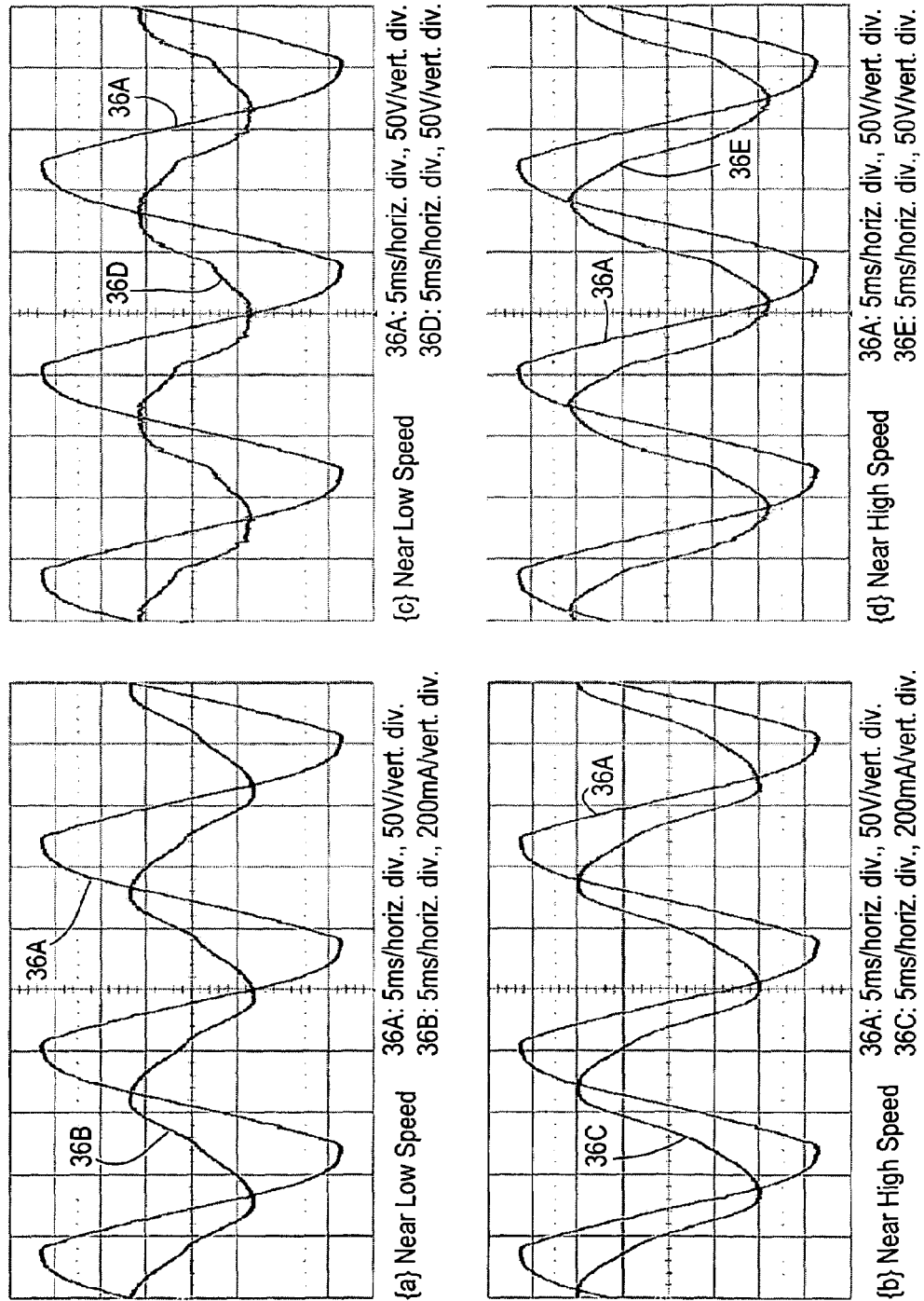
FIG. 1F shows further waveforms for the circuit of FIG. 1D.

The second mode of operation (referred to herein as "static capacitor switching" mode) functions in a similar manner to the prior art fan speed control 20 of FIG. 1D. In this mode, the shunt switch 54 and the switch 84 remain open and the switches 93, 94, 95 are selectively opened or closed to provide discrete steps in the speed of the fan motor 42.

Further, the fan speed control 90 is operable to run in a third mode of operation. In this mode, the switches 84, 93, 94, 95 are held in the open state and the switches 54 and 92 are actively controlled by two PWM signals. The switches are altered between non-conductive and conductive states in a complementary manner such that when switch 54 is on, switch 92 is off, and vice versa. In this way, the fan motor 42 is either connected to the AC voltage source 40, or is shorted allowing the current through the fan motor 42 to flow through the switch 54. This mode of operation is described in greater detail in U.S. Pat. No. 6,909,258, issued Jun. 21, 2005, entitled CIRCUIT DEVICE FOR DRIVING AN AC ELECTRIC LOAD, the entire disclosure of which is incorporated herein by reference.

In a preferred embodiment of the present invention, the fan speed control 90 is operable to alternately switch between modes of operation to provide continuously variable, quiet fan speed operation. The first mode of operation (i.e., 120 Hz AC buck mode) offers a continuously variable speed of the fan motor. However, some commercially available fan motors are not as quiet as desired when using the first mode of operation at higher speeds. The second mode of operation (i.e., static capacitor switching mode) allows very quiet operation at higher speeds, but is limited because the control is not continuously variable. However, an average person will not typically see the difference between the discrete steps in the speeds of a fan motor when the fan motor is operating at high speeds. The continuously variable control is most desired as a feature of the fan speed control 90 when the fan motor is operating at low speeds and changes in the fan speed are typically more noticeable by the human eye.

Figure 10:
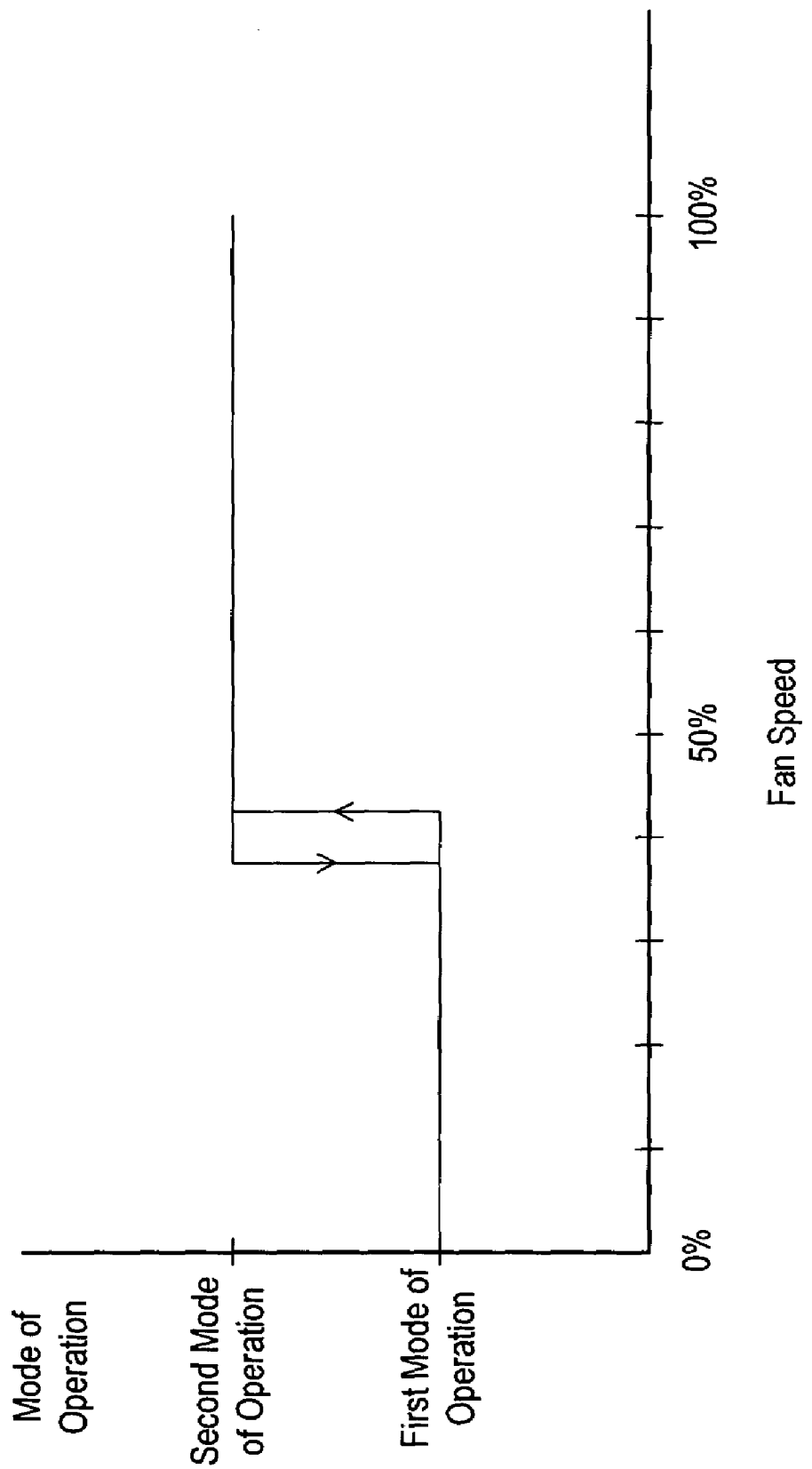
FIG. 10 shows a graph of the mode of operation of the fan speed control of FIG. 9 versus the desired speed of the fan motor.

Thus, a preferred method of operation of the fan speed control 90 is to use the first mode of operation (i.e., 120 Hz AC buck mode) when the fan motor is operating at low speeds (below approximately 40% of the maximum fan speed), and the second mode of operation (i.e., static capacitor switching mode) when the fan motor is operating at high speeds (above approximately 40% of the maximum fan speed) as shown in FIG. 10. The control circuit 99 is operable to determine the desired fan speed and cause the fan speed control 90 to switch between modes of operation. In FIG. 10, the threshold for changing modes of operations is approximately 40% of the maximum fan speed, and some hysteresis is provided. Because of the wide variation in the operating characteristics of fan motors, the threshold for changing modes of operation is preferably operable to be altered by a user through a user interface of the fan speed control 90 to determine the optimal threshold for the specific application.

While the present invention has been described in regards to control of a fan motor, the load control device of the present invention may be used to control any type of motor or another type of load, such as an incandescent lamp.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. An apparatus for controlling the speed of an AC motor to be driven from an AC supply voltage from an AC source, comprising:
   a first series capacitor adapted to be coupled in series electrical connection between the AC source and the AC motor;
   a shunt switch adapted to be coupled in shunt electrical connection across the AC motor, the switch having a control input; and
   a control circuit coupled to the control input for controlling the conduction time of the shunt switch;
   whereby the motor speed is controllable in dependence upon the conduction time of the shunt switch and wherein the control circuit causes the shunt switch to become conductive when the voltage across the motor is approximately zero volts.

2. The apparatus of claim 1, wherein the control circuit is operable to generate a pulse-width modulated signal for controlling the conduction time of the shunt switch, the pulse-width modulated signal having a variable duty cycle for varying the motor speed.

3. The apparatus of claim 2, wherein the variable duty cycle is continuously variable.

4. The apparatus of claim 2, wherein the variable duty cycle is discretely variable.

5. The apparatus of claim 2, wherein the control circuit is operable when starting up the motor to open the shunt switch for a predetermined period of time before controlling the shunt switch with the pulse-width modulated signal.

6. The apparatus of claim 2, further comprising:
   a bypass switch coupled in parallel electrical connection across the first series capacitor to bypass the first series capacitor to achieve substantially full speed operation of the motor;
   wherein the control circuit is operable when starting up the motor to close the bypass switch for a predetermined period of time before opening the bypass switch and controlling the shunt switch with the pulse-width modulated signal.

7. The apparatus of claim 6, further comprising:
   a first series switch coupled in series electrical connection with the first series capacitor, the first series switch having a control input, the first series switch and the first series capacitor coupled parallel to the bypass switch;
   a second series capacitor adapted to be coupled in series electrical connection between the AC source and the AC motor; and
   a second series switch coupled in series electrical connection with the second series capacitor, the second series switch having a control input, the second series switch and the second series capacitor coupled parallel to the first series switch and the first series capacitor;
   wherein the control circuit is operable to maintain the shunt switch non-conductive while discretely controlling the first series switch and the second series switch, such that the motor speed is discretely controllable in dependence upon the conduction states of the first series switch and the second series switch.

8. The apparatus of claim 7, further wherein the control circuit is operable to control the shunt switch with a pulse-width modulated signal when a desired motor speed is above a predetermined threshold and to discretely control the first series switch and the second series switch when the desired motor speed is below the predetermined threshold.

9. The apparatus of claim 1, wherein the control circuit controls the conduction time of the shunt switch at a frequency dependent on the line frequency of the AC supply voltage.

10. The apparatus of claim 9, wherein the control circuit controls the conduction time of the shunt switch at a frequency that is twice the line frequency of the AC supply voltage.

11. The apparatus of claim 1, further comprising:
   a motor voltage monitoring circuit adapted to be coupled to the motor for monitoring a voltage across the motor; the motor voltage monitoring circuit having an output coupled to the control circuit.

12. The apparatus of claim 1, wherein the shunt switch comprises a semiconductor device.

13. The apparatus of claim 12, wherein the semiconductor device comprises two field-effect transistors in anti-serial connection.

14. The apparatus of claim 12, wherein the semiconductor device comprises a field-effect transistor in a rectifier bridge.

15. The apparatus of claim 1, further comprising a bypass switch coupled in parallel electrical connection across the first series capacitor to bypass the first series capacitor to achieve substantially full speed operation of the motor.

16. The apparatus of claim 15, wherein the bypass switch comprises a semiconductor device.

17. The apparatus of claim 1, further comprising: a shunt capacitor adapted to be coupled in shunt electrical connection across the AC motor.

18. A method for controlling the speed of an AC motor driven from an AC supply voltage from an AC source, comprising the steps of:
coupling a first capacitor in series electrical connection between the AC source and the AC motor;
coupling a shunt switch in shunt electrical connection across the AC motor, the shunt switch having a control input for controlling the conduction time of the shunt switch; and
controlling the conduction time of the shunt switch to vary the speed of the motor;
whereby the motor speed is controllable in dependence upon the conduction time of the shunt switch and wherein the step of controlling causes the shunt switch to become conductive when the voltage across the motor is approximately zero volts.

19. The method of claim 18, wherein the step of controlling comprises generating a pulse-width modulated signal for controlling the conduction time of the shunt switch, the pulse-width modulated signal having a variable duty cycle for varying the motor speed.

20. The method of claim 19, wherein the variable duty cycle is continuously variable.

21. The method of claim 19, wherein the variable duty cycle is discretely variable.

22. The method of claim 19, further comprising the steps of:
opening the shunt switch for a predetermined amount of time when starting up the motor to achieve maximum speed operation of the motor; and
controlling the shunt switch with the pulse-width modulated signal after the predetermined amount of time has elapsed.

23. The method of claim 19, further comprising the steps of:
coupling a bypass switch in parallel electrical connection with the first capacitor;
closing the bypass switch for a predetermined amount of time when starting up the motor to bypass the first capacitor to achieve substantially full speed operation of the motor;
opening the bypass switch after the predetermined amount of time has elapsed; and
controlling the shunt switch with the pulse-width modulated signal after the predetermined amount of time has elapsed.

24. The method of claim 19, further comprising the steps of:
coupling a first series switch in series electrical connection with the first capacitor, the first series switch having a control input, the first series switch and the first capacitor coupled parallel to the bypass switch;
coupling a second capacitor in series electrical connection between the AC source and the AC motor; and
coupling a second series switch in series electrical connection with the second capacitor, the second series switch having a control input, the second series switch and the second capacitor coupled parallel to the first series switch and the capacitor; and
discretely controlling the first and second series switches while maintaining the shunt switch non-conductive;
whereby the motor speed is discretely controllable in dependence upon the conduction states of the first and second series switches.

25. The method of claim 24, further comprising the steps of:
controlling the shunt switch with a pulse-width modulated signal when a desired motor speed is above a predetermined threshold; and
discretely controlling the first and second series switches when the desired motor speed is below the predetermined threshold.

26. The method of claim 18, wherein the step of controlling comprises controlling the conduction time of the shunt switch at a frequency dependent on the line frequency of the AC supply voltage.

27. The method of claim 26, wherein the step of controlling comprises controlling the conduction time of the shunt switch at a frequency that is twice the line frequency of the AC supply voltage.

28. The method of claim 18, wherein the step of controlling comprises monitoring a voltage across the motor.

29. The method of claim 18, wherein the shunt switch comprises a semiconductor device.

30. The method of claim 29, wherein the semiconductor device comprises two field-effect transistors in anti-serial connection.

31. The method of claim 29, wherein the semiconductor device comprises a field-effect transistor in a rectifier bridge.

32. The method of claim 18, further comprising the steps of:
coupling a bypass switch in parallel electrical connection with the first capacitor; and
closing the bypass switch to bypass the first capacitor to achieve substantially full speed operation of the motor.

33. The method of claim 32, wherein the bypass switch comprises a semiconductor device.

34. The method of claim 18, further comprising the step of: coupling a second capacitor in shunt electrical connection across the AC motor.

* * * * *